United States Patent [19]

Hasegawa et al.

[11] Patent Number: 5,596,430
[45] Date of Patent: Jan. 21, 1997

[54] DISTRIBUTED INDEX LIGHT DEFLECTOR AND METHOD OF LIGHT DEFLECTION

[75] Inventors: Masaki Hasegawa, Kamakura; Fumiaki Yamada, Yokohama, both of Japan

[73] Assignee: International Business Machines Corporation, Armonk, N.Y.

[21] Appl. No.: 293,261

[22] Filed: Aug. 22, 1994

[30] Foreign Application Priority Data

Aug. 20, 1993 [JP] Japan ................................ 5-206241

[51] Int. Cl.⁶ ........................... G02F 1/133; G02F 1/134
[52] U.S. Cl. ............................... 349/74; 349/77; 349/31; 349/33
[58] Field of Search ............................ 359/53, 94, 93, 359/95, 54, 84, 87

[56] References Cited

U.S. PATENT DOCUMENTS

| | | | |
|---|---|---|---|
| 3,791,716 | 2/1974 | Borel et al. | 359/95 |
| 3,843,231 | 10/1974 | Borel et al. | 359/94 |
| 3,980,396 | 9/1976 | Pollack et al. | 359/95 |
| 4,106,858 | 8/1978 | Dargent et al. | 359/84 |
| 4,183,629 | 1/1980 | Nishimura et al. | 359/53 |
| 4,813,770 | 3/1989 | Clerc et al. | 359/53 |
| 4,906,072 | 3/1990 | Kaneko et al. | 359/56 |
| 4,937,539 | 6/1990 | Grinberg et al. | 359/93 |
| 4,958,914 | 9/1990 | Owechko et al. | 359/94 |
| 4,964,701 | 10/1990 | Dorschner et al. | 359/94 |
| 5,018,835 | 5/1991 | Dorschner | 359/94 |
| 5,018,838 | 5/1991 | Barnes et al. | 359/94 |
| 5,136,406 | 8/1992 | Kato et al. | 359/93 |
| 5,150,241 | 9/1992 | Joffre et al. | 359/94 |
| 5,151,814 | 9/1992 | Grinberg et al. | 359/93 |

FOREIGN PATENT DOCUMENTS

0244924  12/1985  Japan ........................................ 359/53

*Primary Examiner*—Anita Pellman Gross
*Assistant Examiner*—Toan Ton
*Attorney, Agent, or Firm*—Ronald L. Drumheller

[57] ABSTRACT

A high-resistance transparent electrode is bonded on the opposite surface of a first glass substrate from a second glass substrate, and a low-resistance transparent electrode is bonded on the opposite surface of the second glass substrate from the first glass substrate. A pair of deflecting angle control electrodes are fixed to the high-resistance transparent electrode in parallel. A liquid crystal orientation film covers the high-resistance transparent electrode and the deflecting angle control electrodes, and another liquid crystal orientation film covers the low-resistance transparent electrode. Spacers are disposed in parallel between the liquid crystal orientation films, and the cell formed by the liquid crystal orientation films and spacers is filled with a nematic liquid crystal. When the voltage impressed between the low-resistance transparent electrode and the high-resistance transparent electrode and to both ends of the high-resistance transparent electrode is varied, the potential gradient varies, and the refraction index gradient varies in the same way. When light passes through a liquid crystal having such a refraction index gradient, the light is deflected depending on the distribution of refraction indices. When the refraction index gradient is varied by varying the potential gradient, the angle of deflection varies.

10 Claims, 4 Drawing Sheets

$\Delta\varepsilon < 0$
Vertical Orientation $\Delta\varepsilon > 0$
Horizontal Orientation

DISTRIBUTED INDEX LIGHT DEFLECTOR AND METHOD OF LIGHT DEFLECTION

BACKGROUND OF THE INVENTION

1. Field of the Invention

This invention relates to a distributed index light deflector and a method of deflecting light, and in particular, to a distributed index light deflector which has no movable mechanical parts and can be used in the blur compensation mechanisms for laser printers, bar-code readers, television cameras, and the like.

2. Background Art

Although light deflectors have been used in various equipment, most of them deflect light with mechanical movement. In laser printers, a polyhedral mirror is rotated and reflected laser beams are deflected by continuously varying the direction of the mirror. In the tracking mechanism of photomagnetic disks, light is deflected by moving a lens horizontally or by changing the direction of the reflecting mirror. A recent blur compensating mechanism for television cameras uses a prism composed of a liquid, and the image is moved on the image pickup tube by changing the shape of the prism. However, these mechanisms are complicated and are difficult to assemble and adjust, and have low resistance to vibration. In addition, the speed of deflection is limited by the size and weight of the mechanical parts. Furthermore, as the deflection speed is increased, power consumption also increases.

To solve these disadvantages, a light deflector without mechanical movement, such as a variable diffraction lattice using surface elastic wave elements (SAW device), has been proposed (see Hiroshi Sunagawa, "A Waveguide Type Acoustic Optical Wide Angle Deflector," Kogaku, Vol. 19, No. 4, p. 232). This light deflector deflects light by varying the lattice spacing by forming a SAW device in the waveguide and varying the frequency of elastic waves. However, the efficiency of diffraction is poor and the utilization of light is low, and formation of the element is difficult.

For these reasons, light deflectors utilizing liquid crystals, which allow easy fabrication of devices and allow large variations in diffraction indices, have been proposed.

These include a light deflector having an extremely large number of transparent electrodes (S. T. Kowel, D. S. Clerverly, and P. G. Kornreich, "Focusing by electrical modulation of reflection in a liquid crystal cell," Applied Opt., 23, 278 (1984)); a light deflector for deflecting light by impressing a high voltage between two electrodes to change the orientation of liquid crystals (A. F. Fray, D. Jones, "Large-angle beam deflector using liquid crystal," Electro. Lett., 11, 358 (1975)); A. Sasaki, T. Ishibashi, "Liquid-crystal light deflector," Electro. Lett., 15, 293 (1979)); a variable diffraction lattice utilizing the William's domain formed by a DC current (Mitsuharu Okano, Shunsuke Kobayashi, "Liquid Crystals: Application," Baifu-kan, p. 213 (1989)); a light deflector using switching by total reflection (G. Labrunie and S. Valette, "Nematic Liquid Crystal Digital. Light Deflector," Appl. Oct., 13, 1802 (1974)); a light deflecting device using the total reflection effect in the interface of liquid crystals (R. A. Kashnow and C. R. Stein, "Total-Reflection Liquid Crystal Electrooptic Device," Appl. Opt., 12, 2309 (1973)); Japan Society for the Promotion of Science, Committee No. 142, "Liquid Crystal Device Handbook," Nikkan Kogyo Shimbun-sha, p. 617 (1989)).

However, since the first cited light deflector described above has a large number of transparent electrodes deflect light by forming the distribution of refractive indices in a liquid crystal by controlling the voltage impressed to each electrode, the distribution of electric fields in the liquid crystal does not vary uniformly but varies stepwise. Therefore, there is a problem in that the distribution of refractive indices also becomes stepwise, resulting in disturbance of the wave surface of deflected light. Although this tendency may be decreased by increasing the number of electrodes, such a large number of electrodes would be required to maintain the smooth wave surface of the light to be deflected, that this is practically impossible.

The second cited light deflector to which a high voltage is impressed deflects light by impressing a high voltage between two separate electrodes to gradually bend liquid crystal molecules between two glass sheets. Although a large deflecting angle may be obtained in this system, there is the problem that the wave surface of the deflected light is disturbed because the distribution of refraction indices of the liquid crystal cannot be varied uniformly. The pattern of the beam is also disturbed.

The cited variable diffraction lattice utilizing William's domain forms a diffraction lattice by applying a high-voltage direct current and producing a flow of ions in the liquid crystal, and varies the size of the domain by controlling the voltage. Thus, the lattice spacing varies and the deflecting angle of the primary diffracted light is controlled. In this system, there are the problems that the intensity of higher diffracted light such as primary and secondary cannot be controlled, and the efficiency of usage of light which can be deflected is low, as in SAW devices. The deflecting angle also varies according to the wavelength of the light.

The cited light deflecting device utilizing total reflection enables deflection to be switched in only two directions, and the deflecting angle cannot be controlled continuously or randomly. Therefore, there is the problem that this system cannot be applied to laser beam scanning devices such as laser printers or to display devices.

SUMMARY OF THE INVENTION

To solve the above problems, it is the object of this invention to provide a distributed index light deflector and a method of deflecting light in which the wave surface of deflected light is not disturbed, the efficiency of light is high, and no movable mechanical parts are used.

To achieve the above and other objects of this invention, the invention comprises a first transparent substrate in which a first high-resistance transparent electrode is disposed on one side surface thereof; a second transparent substrate in which a second low-resistance transparent electrode is disposed on one side surface thereof, said second transparent substrate being disposed such that its surface, on which the second transparent electrode is disposed, is opposite to the surface on which the first transparent electrode of the first transparent substrate is disposed; a liquid crystal interposed between said first transparent electrode and said second transparent electrode; and a power supply which applies variable voltage between said first transparent electrode and said second transparent electrode and to both ends of said first transparent electrode.

In another embodiment, the invention comprises a first transparent substrate in which a first high-resistance transparent electrode is disposed on one side surface thereof; a second transparent substrate in which a second low-resistance transparent electrode is disposed on one side surface thereof, said second transparent substrate being disposed such that its surface, on which the second transparent electrode is disposed, is opposite to the surface on which the first transparent electrode of the first transparent substrate is disposed; a third transparent substrate disposed between said first transparent substrate and said second transparent substrate, in which the first high-resistance transparent electrode is disposed on one side surface thereof and the second low-resistance transparent electrode is disposed on the other side surface thereof, said third transparent substrate being disposed such that its surface on which the second transparent electrode is disposed, is opposite to the surface on which the first transparent electrode of the first transparent substrate is disposed, and its surface on which the first transparent electrode is disposed, is opposite to the surface on which the second transparent electrode of the second transparent substrate is disposed; a liquid crystal interposed between each of said first transparent electrode and said second transparent electrode; and a power supply which applies variable voltage between said first transparent electrode and said second transparent electrode and to both ends of said first transparent electrode.

In still another embodiment, the invention comprises a first transparent substrate in which a first high-resistance transparent electrode is disposed on one side surface thereof; a second transparent substrate in which a second low-resistance transparent electrode is disposed on one side surface thereof, said second transparent substrate being disposed such that its surface on which the second transparent electrode is disposed is opposite to the surface on which the first transparent electrode of the first transparent substrate is disposed; a third transparent substrate group in which the first high-resistance transparent electrode is disposed on one side surface thereof and the second low-resistance transparent electrode is disposed on the other side surface thereof, said third transparent substrate group being composed of a plurality of substrates such that said first transparent electrode is opposite to said second transparent electrode, said third transparent substrate group being disposed between said first transparent substrate and said second transparent substrate, such that the outermost surface on which said second transparent electrode is disposed is opposite to the surface on which the first transparent electrode of the first transparent substrate is disposed, and the outermost surface on which the first transparent electrode is disposed is opposite to the surface on which the second transparent electrode of said second transparent substrate is disposed; a liquid crystal interposed between said first transparent electrode and said second transparent electrode; and a power supply which applies variable voltage between said first transparent electrode and said second transparent electrode and to both ends of said first transparent electrode.

In any of the forementioned embodiments, the liquid crystal preferably is a nematic liquid crystal.

The invention also is a method of deflecting light using a light deflector including at least one layer having a first transparent electrode, a second transparent electrode disposed such that said second transparent electrode is opposite to the first transparent electrode, and a liquid crystal disposed between said first transparent electrode and said second transparent electrode, in which a voltage is impressed between the first transparent electrode and the second transparent electrode, such that an electric field having a gradient continuously varying from one end of the first transparent electrode towards the other end thereof is produced, and linearly polarized light is applied from the first or the second transparent electrode side.

In the first embodiment, when voltage is applied between the first high-resistance transparent electrode and to second low-resistance transparent electrode and the both ends of the first high-resistance transparent electrode, potential distribution varies continuously in the first transparent electrode from one end to the other end because the first electrode has high resistance, and thus an electric field of the distribution having a gradient continuously varying from one end of the first transparent electrode to the other end is impressed between the first transparent electrode and the second transparent electrode. Since a liquid crystal is disposed between the first transparent electrode and the second transparent electrode, the orientation of liquid crystal molecules is inclined according to this gradient electric field, and the distribution of refractive indices is obtained according to the orientation of the liquid crystal molecules. A monoaxial nematic liquid crystal may be used as such a liquid crystal, but other types of liquid crystal may also be used.

Orientation before impressing voltage differs according to the type of liquid crystal. A liquid crystal having a positive dielectric constant is oriented in parallel to the transparent substrate, while the liquid crystal having a negative dielectric constant is oriented perpendicular to the transparent substrate. Since liquid crystal molecules have a long and thin structure, they are optically isomeric and have different refractive indices between the direction of the molecular axis and the direction perpendicular to the molecular axis. When a gradient electric field is impressed, the orientation of liquid molecules is inclined and a distribution of refractive indices is obtained. When linearly polarized light is applied to the first transparent substrate almost perpendicularly and in a direction parallel to the surface whose orientation is inclined by the electric field of the oriented liquid crystal molecules (abnormal light), the incident light is bent in the direction of the larger refractive index and projected from the second transparent substrate. Therefore, an incident light may be deflected and projected in the predetermined direction.

Here, in this invention, since varying voltage is impressed between the first transparent electrode and the second transparent electrode and to both ends of the first transparent electrode, the distribution of refractive indices of the liquid crystal depend on the voltage impressed, by which the deflecting angle of light projected from the second transparent substrate may be controlled. That is, when a continuously varying voltage is impressed, the deflecting angle may be varied continuously; when a periodically varying voltage is impressed, the deflecting angle may be varied periodically; and when a randomly varying voltage is impressed, the deflecting angle may be varied randomly.

When a third transparent substrate, on which a first high-resistance transparent electrode is disposed on one side surface and a second low-resistance transparent electrode is disposed on the other side surface, is disposed between one or a plurality of first transparent electrodes and second transparent electrodes, and a liquid crystal is disposed between the first transparent electrode and the second transparent electrode, as the second and third embodiments, incident light is deflected by each liquid crystal. The angle of deflection may be controlled by increasing the angle of deflection of light projected from the last transparent substrate.

In this invention, since an electric field that is continuously varied by the resistance of the first transparent electrode is used, the variation of the refractive index is continuous, the wave surface of deflected light is not disturbed, and light is bent in the direction of the molecular axis, thus resulting in high efficiency of light utilization.

The invention also is a method of deflecting light using a light deflector including at least one layer having a first transparent electrode, a second transparent electrode disposed opposite to the first transparent electrode, and a liquid crystal disposed between said first transparent electrode and said second transparent electrode, in which a voltage is impressed between the first transparent electrode and the second transparent electrode, such that an electric field having a gradient continuously varying from one end of the first transparent electrode towards the other end thereof is produced, and linearly polarized light is applied from the first or the second transparent electrode side. To produce an electric field having a gradient which varies continuously from one end of the first transparent electrode to the other end between the first transparent electrode and the second transparent electrode, a high-resistance transparent electrode and a low-resistance transparent electrode may be used as described above.

DESCRIPTION OF THE PREFERRED EMBODIMENTS

Figure 1:
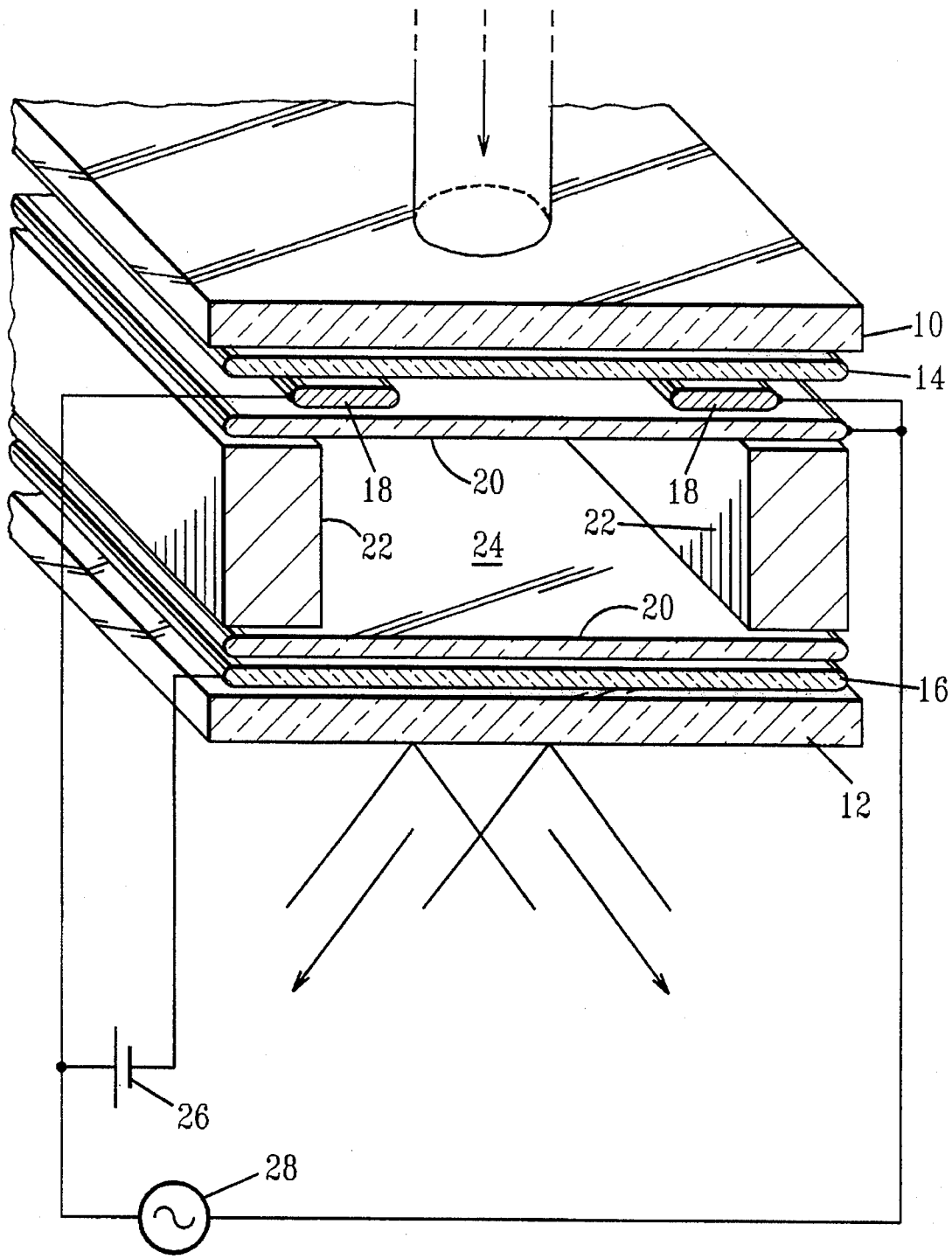
FIG. 1 shows a perspective view of a first embodiment of this invention.
Figure 2C:
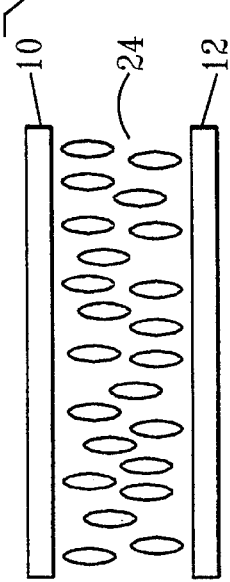
FIGS. 2C and 2D are schematic diagrams showing the orientation of liquid crystal molecules when their dielectric constant is negative.
Figure 2D:
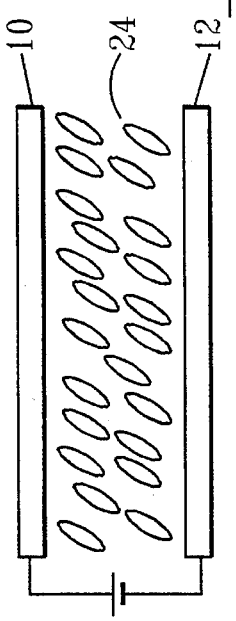
Figure 2A:
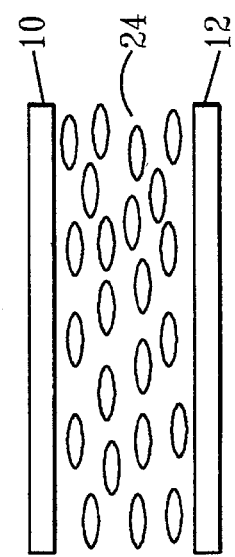
FIGS. 2A and 2B are schematic diagrams showing the orientation of liquid crystal molecules when their dielectric constant is positive.
Figure 2B:
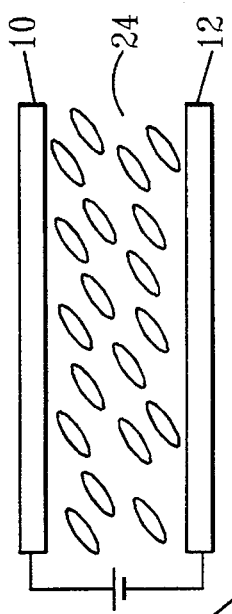

The embodiments of this invention will be described in detail with reference to drawings. As FIG. 1 shows, a distributed index light deflector of this invention comprises a first glass substrate 10 as a first transparent substrate and a second glass substrate 12 as a second transparent substrate, disposed in parallel. On the surface of the first glass substrate 10 opposite to the second glass substrate 12, a high-resistance transparent electrode 14 is bonded as the first transparent electrode, and on the surface of the second glass substrate 12 opposite to the first glass substrate 10, a low-resistance transparent electrode 16 is bonded as the second transparent electrode. On the high-resistance transparent electrode 14, a pair of deflecting angle control electrodes 18 are attached in parallel. A liquid crystal orientation film 20 covers the high-resistance transparent electrode 14 and the deflecting angle control electrodes 18, and another liquid crystal orientation film 20 covers the low-resistance transparent electrode 16. Spacers 22 are disposed in parallel between the liquid crystal orientation films 20 so as to extend in the direction in which deflecting angle control electrodes 18 extend, forming a cell with the liquid crystal orientation film 20 and the spacer 22 to be filled with the liquid crystal, This cell is filled with a nematic liquid crystal 24.

To each of deflecting angle control electrodes 18, a deflecting angle controlling power source 28 is connected, and between the deflecting angle control electrodes 18 and the deflecting angle controlling power source 28, the positive pole of the bias power source 26 is connected. The negative pole of the bias power source 26 is connected to the low-resistance transparent electrode 16.

FIG. 2 shows the orientation of a nematic liquid crystal. If the dielectric constant $\Delta\epsilon$ is positive, the liquid crystals are oriented homogeneously, i.e. the molecular axes are oriented in parallel to the glass substrate as shown in FIG. 2A in the state where no voltage is impressed. When a voltage is impressed to these oriented liquid crystals, the orientation of the liquid crystals changes as shown in FIG. 2B. If the dielectric constant $\Delta\epsilon$ is negative, the liquid crystals are oriented homerotropically, i.e. the molecular axes are oriented perpendicular to the glass substrate as shown in FIG. 2C, in the state where no voltage is impressed. When a voltage is impressed to these oriented liquid crystals, the orientation of the liquid crystals changes as shown in FIG. 2D.

Figure 3:
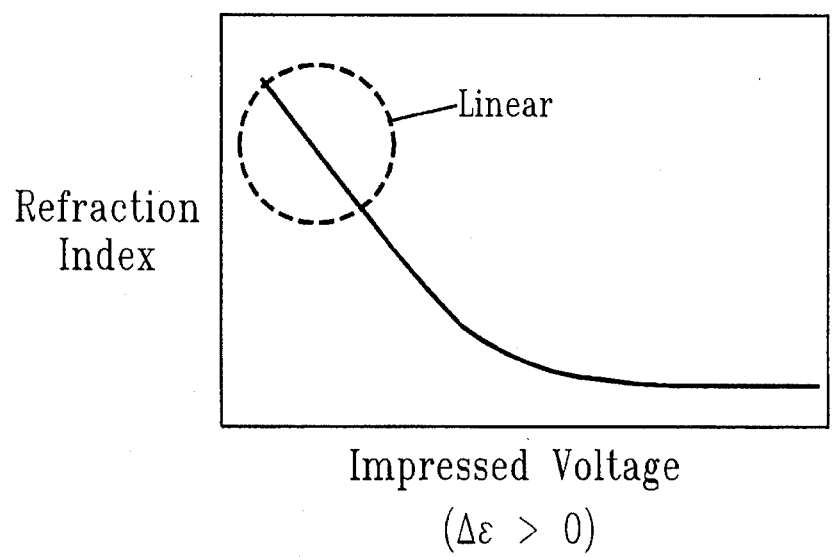
FIG. 3 is a graph showing the relationship between impressed voltage and refractive indices for extraordinary ray when its dielectric constant is positive.

FIG. 3 shows the relationship between the impressed voltage and change in the refractive indices of nematic liquid crystals ($\Delta\epsilon>0$). The reason for this change is that polarized electric dipoles induced by liquid crystal molecules receive force from the external electric field, and the liquid crystal molecules rotate. When the electric field is small, i.e. within the region surrounded by a circle in FIG. 3, there is a linear relationship between impressed electric field and refractive indices.

Figure 4:
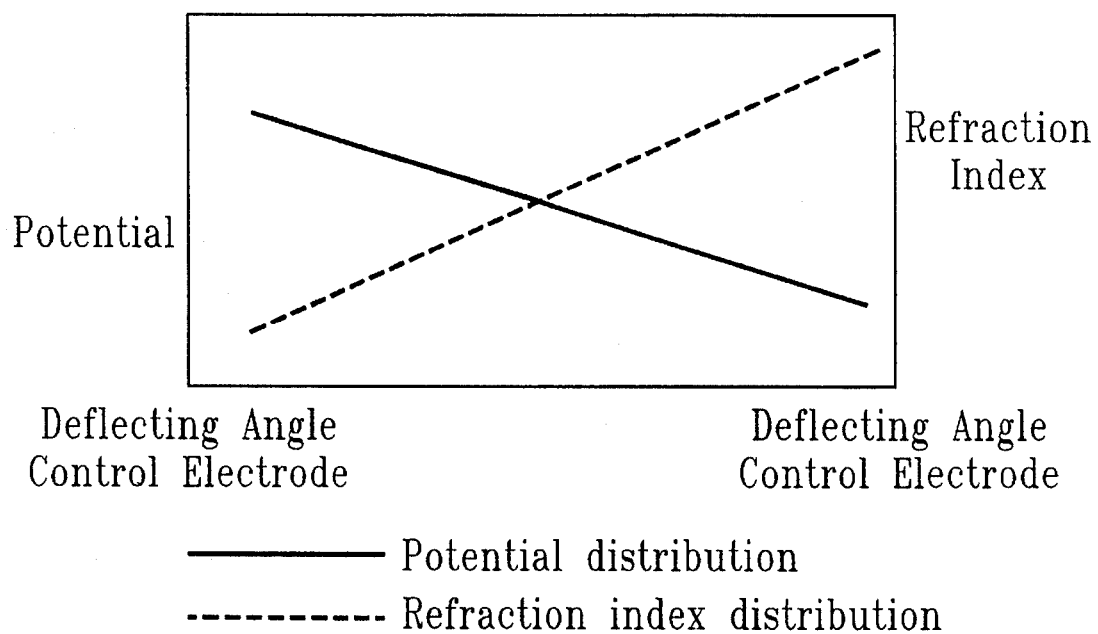
FIG. 4 is a graph showing electric field distribution and refractive index distribution.

When voltage is impressed to both ends of the high-resistance transparent electrode 14 of the distributed index light deflector shown in FIG. 1 through the deflecting angle control electrodes 18, the potential of the high-resistance transparent electrode 14 varies continuously from the fixed position of one deflecting angle control electrode 18 to the fixed position of the other deflecting angle control electrode 18 because the transparent electrode 14 has a high resistance. Furthermore, when a bias voltage is impressed between the low-resistance transparent electrode 16 and the high-resistance transparent electrode 14, an electric field distribution having a straight gradient as shown by the solid line in FIG. 4 is formed between the low-resistance transparent electrode 16 and the high-resistance transparent electrode 14. In liquid crystals existing in this electric field, a refractive index distribution is formed that also varies linearly. When linearly polarized light is applied to the first transparent substrate 10 perpendicularly and in parallel with the surface inclined by the electric field of oriented liquid crystal molecules, the incident light is bent in the direction of the larger refractive index and projected from the second transparent substrate 12. Therefore, the incident light may be deflected and projected in the predetermined direction.

When the voltage impressed between the low-resistance transparent electrode 16 and the high-resistance transparent electrode 14 and to both ends of the high-resistance transparent electrode 14 is varied, the potential gradient varies, and the refraction index gradient varies in the same way. When light passes through liquid crystals having this refraction index gradient, the light is deflected according to the refraction index gradient. When the gradient is varied, the angle of deflection varies.

In this embodiment, since an alternating voltage is impressed from the deflecting angle control power source 28, the voltage impressed between the low-resistance transparent electrode 16 and the high-resistance transparent electrode 14 and to both ends of the high-resistance transparent electrode 14 varies periodically, and the angle of deflection of light projected from the second transparent substrate 12 is periodically varied, enabling the light to be swept.

In this embodiment, since continuous electric field distribution by the resistance of the high-resistance transparent electrode is used, the variation of refraction indices is linear. Therefore, the disturbance of the wave surface of deflected light is minimized, and the light deflector is suitable for application to coherent light. Since the light deflector of this invention has such a simple structure as two glass substrates and electrodes, the manufacturing costs are low.

The angle of deflection for each cell of this embodiment is related to the distance between deflecting angle control electrodes, i.e. the size of the opening and the distance between glass substrates, and the variation of the refraction index of the liquid crystal. It may be represented by the following equation:

Maximum angle of deflection=arctan (cell thickness refraction index variation/size of opening)

The above equation shows that, when the thickness of the cell is increased, the angle of deflection may be increased, but when the same response speed is to be obtained, the voltage must be increased. The response speed depends on the intensity of the electric field, the dielectric constant and the viscoelasticity of the liquid crystal, and is several tens of hertz when the thickness is several tens of microns and the impressed voltage is several volts.

If the thickness of the cell is 50 microns, the variation of the refraction index is 0.1 and the distance between the deflecting angle control electrodes is 3 mm (the diameter of incident light beam is 3 mm), then the maximum angle of deflection is 95 millidegrees, 1.6 milliradians. A decrease in the distance between the deflecting angle control electrodes enables the angle of deflection to be increased, and when the distance between the deflecting angle control electrodes is 30 microns, the angle of deflection is 9.5 degrees, 0.16 radians.

Figure 5:
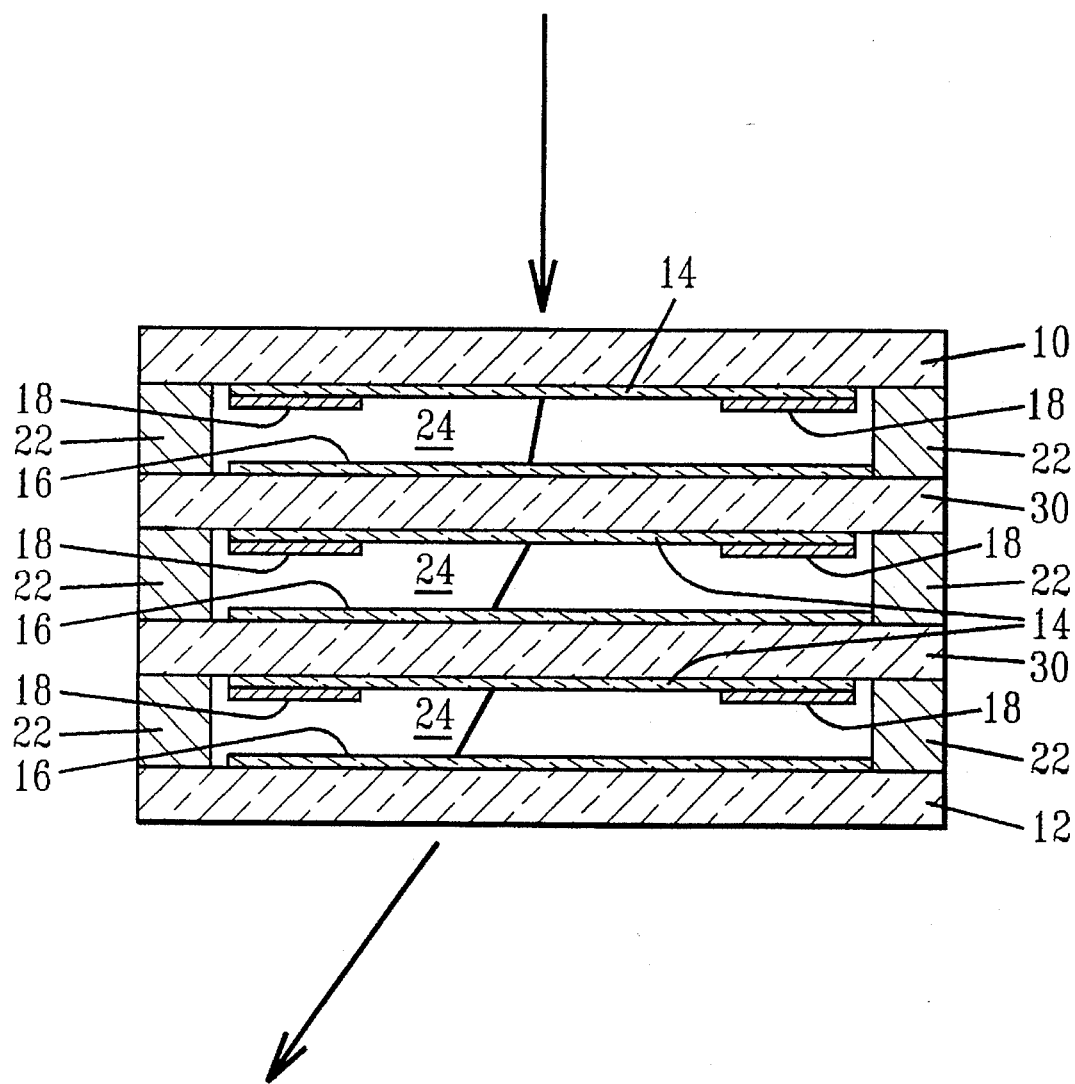
FIG. 5 shows a cross-sectional view of another embodiment of this invention.

Referring now to FIG. 5, a second embodiment of this invention will be described. In this embodiment, two third glass substrates 30, on each of which a high-resistance transparent electrode 14 is bonded on one side surface and a low-resistance transparent electrode 16 is bonded on the other side surface, are disposed between the first glass substrate 10 and the second glass substrate 12. The two third glass substrates 30 are disposed between the first glass substrate 10 and the second glass substrate 12 such that the surface on which the high-resistance transparent electrode 14 is bonded is opposite to the surface on which the low-resistance transparent electrode 16 is bonded, that the outermost surface on which the low-resistance transparent electrode 16 is disposed is opposite to the surface on which the high-resistance transparent electrode 14 of the first transparent substrate 10 is disposed, and that the outermost surface on which the high-resistance transparent electrode 14 is disposed is opposite to the low-resistance transparent electrode 16 of the second transparent substrate 12.

Between the first glass substrate 10 and one of the third glass substrates 30, between the two third glass substrates 30, and between the other third glass substrate 30 and the second glass substrate 12, spacers 22 are disposed in parallel, forming cells to be filled with liquid crystals. Each of the cells is filled with a nematic liquid crystal 24. Although a bias power source and a deflecting angle control power source similar to those of the first embodiment are used in this embodiment, each of the deflecting angle control electrodes 18 of the high-resistance transparent electrode 14 is connected to the deflecting angle control power source, and each of the low-resistance transparent electrodes 16 is connected to the negative pole of the bias power source.

The other details of this embodiment are similar to that of the first embodiment and no description will be required.

In this embodiment, although the angle of deflection can be varied periodically as in the first embodiment described above, light is deflected by each liquid crystal because a plurality of liquid crystal layers are disposed, and the final angle of deflection can be increased. Although examples in which the impressed voltage is varied periodically are described in the above embodiments, the voltage may also be varied continuously or randomly.

Although an example in which two third glass substrates are inserted is described in the above embodiment, one or more than two third electrodes may be inserted.

By disposing a plurality of distributed index light deflectors as described in the first embodiment in parallel, the final angle of deflection may be increased as in the second embodiment. In this case, by adjusting the location of each distributed index light deflector, incident light may be applied to the first glass substrate perpendicularly in each distributed index light deflector, thus minimizing the loss of light.

This invention may be applied in various fields. When this light deflector is used instead of the polygonal mirror of the laser beam scanning optical system used in laser printers, bar-code readers and the like, vibration resistance and reliability are increased. Energy is also saved. Since this light deflector has a small angle of deflection, the length of the light path must be increased when it is used in a laser beam scanning optical system.

By randomly scanning laser beams, characters and graphics may be projected as a projection type display. Although scanning using a polygonal mirror is suitable for sequential scanning such as that of CRTs, it cannot be used for random scanning.

The light deflector of this invention may be attached in front of the objective lens of a CD player to change the incident angle to the lens for minute tracking.

It may be used as a blur compensation mechanism for television cameras to compensate for the blur of images when inserted between the lens and the image pickup tube or the CCD.

According to this invention, as described above, since a liquid crystal is interposed between the first high-resistance transparent electrode and the second low-resistance transparent electrode, and voltage is impressed between the first transparent electrode and the second transparent electrode and to both ends of the first transparent electrode, the effects obtained are that no disturbance of the wave surface is produced, the efficiency of light utilization is high, and light may be deflected without movable mechanical parts.

We claim:

1. A distributed index light deflector comprising:

a first transparent substrate in which a first high-resistance transparent electrode is disposed on one side surface thereof;

a second transparent substrate in which a second low-resistance transparent electrode is disposed on one side surface thereof, said second transparent substrate being disposed such that its surface, on which the second transparent electrode is disposed, is opposite to the surface on which the first transparent electrode of the first transparent substrate is disposed;

a liquid crystal interposed between said first transparent electrode and said second transparent electrode;

means for applying a first voltage along one end of said first high-resistance transparent electrode and a second voltage different from said first voltage along an opposite end of said first high-resistance transparent electrode to produce a voltage that gradually changes monotonically with position across said first high-resistance transparent electrode from said one end to said opposite end; and means for applying a bias voltage to said second low-resistance transparent electrode, said first, second and bias voltages, when applied together, producing an electric field through said liquid crystal and a resulting index of refraction in said liquid crystal that both monotonically vary gradually and continuously across said liquid crystal to deflect linearly polarized light passing through said liquid crystal at a deflection angle that is determined by the difference between said first and second voltages.

2. A distributed index light deflector comprising:

a first transparent substrate in which a first high-resistance transparent electrode is disposed on one side surface thereof;

a second transparent substrate in which a second low-resistance transparent electrode is disposed on one side surface thereof, said second transparent substrate being disposed such that its surface, on which the second transparent electrode is disposed, is opposite to the surface on which the first transparent electrode of the first transparent substrate is disposed;

a third transparent substrate disposed between said first transparent substrate and said second transparent substrate, in which a first high-resistance transparent electrode is disposed on one side surface thereof and a second low-resistance transparent electrode is disposed on the other side surface thereof, said third transparent substrate being disposed such that its surface, on which the second transparent electrode is disposed, is opposite to the surface on which the first transparent electrode of the first transparent substrate is disposed, and its surface on which the first transparent electrode is disposed, is opposite to the surface on which the second transparent electrode of the second transparent substrate is disposed;

a liquid crystal interposed between said first transparent electrode of said first transparent substrate and said second transparent electrode of said third transparent substrate, and a liquid crystal interposed between said first transparent electrode of said third transparent substrate and said second transparent electrode of said second transparent substrate;

means for applying a first voltage along one end of said first transparent electrode of both said first and third transparent substrates and a second voltage different from said first voltage along an opposite end of said first transparent electrode of both said first and third transparent substrates to produce a voltage that gradually changes monotonically with position across said first transparent electrode of both said first and third transparent substrates from said one end to said opposite end thereof; and means for applying a bias voltage to said second transparent electrode of both said second and third transparent substrates, said first, second and bias voltages, when applied together, producing an electric field through said liquid crystals and a resulting index of refraction in said liquid crystals that monotonically varies gradually and continuously across said liquid crystals to deflect linearly polarized light passing through said liquid crystals at a deflection angle that is determined by the difference between said first and second voltages.

3. A distributed index light deflector comprising:

a first transparent substrate in which a first high-resistance transparent electrode is disposed on one side surface thereof;

a second transparent substrate in which a second low-resistance transparent electrode is disposed on one side surface thereof, said second transparent substrate being disposed such that its surface, on which the second transparent electrode is disposed, is opposite to the surface on which the first transparent electrode of the first transparent substrate is disposed;

a third transparent substrate group in which a first high-resistance transparent electrode is disposed on one side surface of each of a plurality of transparent substrates thereof and a second low-resistance transparent electrode is disposed on the other side surface of each of said plurality of transparent substrates thereof, said substrates of said third transparent substrate group being oriented such that each said first transparent electrode of said deflector is opposite to one of said second transparent electrodes of said deflector, said third transparent substrate group being disposed between said first transparent substrate and said second transparent substrate;

a liquid crystal interposed between each of said first transparent electrodes and said second transparent electrode opposite thereto;

means for applying a first voltage along one end of all of said first transparent electrodes and a second voltage different from said first voltage along an opposite end of all of said first transparent electrodes to produce a voltage that gradually changes monotonically with position across each of said first transparent electrodes from said one end to said opposite end thereof; and means for applying a bias voltage to all of said second transparent electrodes, said first, second and bias voltages, when applied together, producing an electric field through said liquid crystals and a resulting index of refraction in said liquid crystals that monotonically varies gradually and continuously across each of said liquid crystals to deflect linearly polarized light passing through said liquid crystals at a deflection angle that is determined by the difference between said first and second voltages.

4. A distributed index light deflector as set forth in claim 1, in which said liquid crystal is a nematic liquid crystal.

5. A distributed index light deflector as set forth in claim 2, in which said liquid crystal is a nematic liquid crystal.

6. A distributed index light deflector as set forth in claim 3, in which said liquid crystal is a nematic liquid crystal.

7. A method of deflecting light using a light deflector including at least one layer having a first transparent electrode having high-resistance, a second transparent electrode having low-resistance and being disposed such that said second transparent electrode is opposite to the first transparent electrode, and a liquid crystal disposed between said first transparent electrode and said second transparent electrode, in which:

a first voltage is applied along one end of said first transparent electrode, a second voltage different from said first voltage is applied along an opposite end of said first electrode and a bias voltage is applied to the second transparent electrode, such that an electric field having a gradient continuously varying monotonically from one end of the first transparent electrode towards the other end thereof is produced, and linearly polarized light is applied from the first or the second transparent electrode side.

8. A distributed index light deflector as defined in claim 1 wherein said means for applying a first voltage and a second voltage includes control electrodes along said one end and said opposite end of said first high-resistance transparent electrode and a voltage source connected between said control electrodes.

9. A distributed index light deflector as defined in claim 8 wherein said means for applying a bias voltage includes a voltage source connected between one of said control electrodes and said second low-resistance transparent electrode.

10. A distributed index light deflector as defined in claim 8 wherein said voltage source connected between said transparent electrodes varies in potential value in a periodic manner to deflect said light beam at an angle having a value that varies in a corresponding periodic manner.

* * * * *